United States Patent [19]

Matai

[11] Patent Number: 5,678,216

[45] Date of Patent: Oct. 14, 1997

[54] RADIO PAGER WITH HIGH GAIN ANTENNA

[75] Inventor: Masahiro Matai, Tokyo, Japan

[73] Assignee: NEC Corporation, Tokyo, Japan

[21] Appl. No.: 325,635

[22] Filed: Oct. 19, 1994

Related U.S. Application Data

[63] Continuation of Ser. No. 891,038, Jun. 1, 1992, abandoned.

[30] Foreign Application Priority Data

May 31, 1991 [JP] Japan ................... 3-155118
Jun. 14, 1991 [JP] Japan ................... 3-169193

[51] Int. Cl.$^6$ ................... H04B 1/06; H01Q 1/24
[52] U.S. Cl. ........... 455/269; 455/300; 455/351; 343/700 MS
[58] Field of Search ................... 455/38.2, 38.4, 455/300, 301, 347, 351, 269; 340/825.44; 361/814, 816, 818; 174/85 R; 343/700 MS, 702; H01Q 1/24

[56] References Cited

U.S. PATENT DOCUMENTS

| | | | |
|---|---|---|---|
| 4,291,312 | 9/1981 | Kaloi | 343/700 MS |
| 4,521,781 | 6/1985 | Campi et al. | 343/700 MS |
| 4,641,366 | 2/1987 | Yokoyama et al. | 343/702 |
| 4,876,537 | 10/1989 | Oyamada | 455/351 |
| 4,924,236 | 5/1990 | Schuss et al. | 343/700 MS |
| 4,980,694 | 12/1990 | Hines | 343/702 |
| 5,054,120 | 10/1991 | Ushiyama et al. | 455/351 |
| 5,079,559 | 1/1992 | Umetsu et al. | 455/347 |

FOREIGN PATENT DOCUMENTS

| | | | |
|---|---|---|---|
| 64443 | 5/1980 | Japan | 455/300 |
| 2-116228 | 10/1988 | Japan | . |

*Primary Examiner*—Reinhard J. Eisenzopf
*Assistant Examiner*—Thanh Le
*Attorney, Agent, or Firm*—Sughrue, Mion, Zinn, Macpeak, and Seas

[57] ABSTRACT

A radio pager for receiving a paging signal with a half-size microstrip antenna. A pair of electrical conductive elements sandwich a printed circuit board on which elements constituting pager circuitry are mounted. The conductive elements and conductive connecting pins fastening them constitute an electromagnetic shield case for the circuitry elements, reducing the radiation of unnecessary electromagnetic waves to the outside from the circuitry mounted on the printed circuit board, particularly a local oscillation circuit. Since the antenna has an earth plate thereof connected to one of the conductive plates with respect to high frequency, the conductive plate plays the role of an earth plate at the same time. As a result, a microstrip base plate is miniaturized while the space available for parts is increased. A ground conductive portion surrounds the antenna element and conceals screws and other conductive structural parts, whereby the antenna directivity pattern is not susceptible to changes in the dimension and position of the conductive structural parts. The conductor of the antenna element may be formed with slits to further miniaturize the antenna element and, therefore, the entire pager.

4 Claims, 7 Drawing Sheets

RADIO PAGER WITH HIGH GAIN ANTENNA

This is a continuation of application Ser. No. 07/891,038 filed Jun. 1, 1992, abandoned.

BACKGROUND OF THE INVENTION

1. Field of the Invention

The present invention relates to a radio pager for receiving a paging signal sent from a central station of a radio paging system with a microstrip antenna and, more particularly, to a radio pager which has a high performance microstrip antenna capable of reducing the radiation of unnecessary electromagnetic waves, operates stably, and implements a miniature and inexpensive configuration.

2. Description of the Prior Art

It is a common practice with the above-described type of radio pager to convert a paging signal (electromagnetic wave) sent from a central station to a received signal by a half-size microstrip antenna and apply the received signal to a radio frequency circuit, or simply radio circuit. A double superheterodyne receiving section is included in the radio circuit for converting the received signal to an intermediate frequency (IF) signal. A demodulator also included in the radio circuit demodulates the IF signal to produce a corresponding digital signal. A waveform shaping circuit shapes the waveform of the digital signal and feeds the resulting signal to a decoder. The decoder compares a call signal included in the digital signal with an address number assigned to the pager and stored in a ROM (Read Only Memory). If the former is identical with the latter, the decoder drives a loudspeaker to produce an alert tone. If a message signal is also included in the digital signal, the decoder makes a corresponding message display on a liquid crystal display (LCD). The pager includes a battery package while the decoder includes a DC/DC converter fed by the battery package. The circuits mentioned above are each fed by either or both of the battery package and the DC/DC converter.

To fabricate the microstrip antenna, use is made of a microstrip base plate consisting of a dielectric base plate and a thin conductor provided on both surfaces of the dielectric base plate. The microstrip base plate is etched and then formed with through holes. Specifically, the conductor is left on one surface of the dielectric base plate in a quadrangular shape to form an antenna element and is left on the other surface over substantially the entire surface of the latter to form an earth plate. The antenna element is connected to the earth plate in the vicinity of one side of the quadrangle thereof by a number of through holes, so that the one side forms a short-circuit side. Usually, the earth plate is provided with a greater area than the antenna element to increase the antenna gain in the frontal direction (toward the antenna element surface).

In the conventional pager, most of the electric and electronic parts (except for the microstrip antenna, LCD and battery package), i.e., a major part of pager circuitry is mounted on a printed circuit board. A frame supports the circuitry mounted on the printed circuit board and substantially determines the contour of the pager. Further, the frame supports the antenna such that the earth plate of the antenna faces the ground surface of the printed circuit board. Such constituent parts and elements of the pager are accommodated in a case.

Generally, the radiation level of unnecessary electromagnetic waves from the radio pager is regulated by standards.

2

For example, U.S. Federal Communications Commission Rules and Regulations, Part 15 prescribes that the radiation level of unnecessary electromagnetic waves from radio frequency devices, including the radio pager, should be lower than 46 dBµV/m for frequencies of 16 MHz to 960 MHz and measured at a distance of 3 m. Regarding the radio pager, the greatest radiation is usually ascribable to a first local oscillation circuit included in the double superheterodyne receiving section. Therefore, the radiation from the first local oscillation circuit included in the circuitry on the printed circuit board needs primary attention.

To meet the FCC standards, for example, the state-of-the-art pager has only the first local oscillation circuit disposed in a shield case to reduce the radiation level by about 1.0 dB. The shield case, however, increases the height of the printed circuit board of the first local oscillation circuit and, therefore, the overall thickness of the pager. In addition, the shield case has to be soldered or otherwise affixed to the printed circuit board, increasing the production cost of the pager.

Another problem with the conventional pager is that signal interference is apt to occur between the microstrip antenna and another pager circuitry and between other pager circuitry via the antenna. The pager is, therefore, not only prevented from operating stably but also susceptible to external circuitry, especially human body, which may approach it.

Moreover, there is a keen demand for the saving of production cost by reducing the consumption of expensive microstrip base plate while preserving the high performance of the microstrip antenna, as well as for further miniaturization.

BRIEF SUMMARY OF THE INVENTION

Objects of the Invention

It is therefore an object of the present invention to provide a radio pager which radiates a minimum of unnecessary electromagnetic waves.

It is another object of the present invention to provide a radio pager operable in a stable manner and feasible for miniaturization.

It is still another object of the present invention to provide a radio pager having a high performance and inexpensive microstrip antenna structure.

It is a further object of the present invention to provide a radio pager having considerable design freedom.

BRIEF DESCRIPTION OF THE DRAWINGS

The above-mentioned and other objects, features and advantages of the present invention will become more apparent from the following detailed description when taken in conjunction with the accompanying drawings, wherein.

SUMMARY OF THE INVENTION

A radio pager of the present invention, like the conventional pager, includes a microstrip antenna, a radio circuit, waveform shaping circuit, a decoder, a ROM, a loudspeaker, an LCD, and a battery package. The pager of the invention is characterized by the structure thereof and the improved structure of the antenna.

Most of the electric and electronic parts and elements constituting the pager are mounted on the printed circuit board. Two conductive plates implemented by sheet metal, for example, are positioned to sandwich the printed circuit board. The outer surface of one of the conductive plates and the earth plate of the microstrip antenna are connected to each other with respect to high frequency by thermal adhesion or similar technology. The conductive plates are fastened together by screws or similar conductive connecting pins around the circuitry mounted on the printed circuit board. The conductive plates and connecting pins constitute a shield case for the circuitry mounted on the printed circuit board, whereby the circuitry is electromagnetically shielded from the antenna and external circuitry. As a result, radiations from, for example, a first local oscillator mounted on the printed circuit board are confined in the shield case formed by the conductive plates and connecting pins. This not only reduces the radiation of unnecessary electromagnetic waves from the radio pager to external circuitry but also eliminates signal interference between the independent circuits on the printed circuit board via the antenna and thereby stabilizes the operation of the circuitry.

To increase the antenna gain of the microstrip antenna in the frontal direction, it is necessary to provide the earth plate with a greater area than the antenna element. In the pager of the invention, one of the conductive plates each being broader than the earth plate is connected to the earth plate with respect to high frequency, so that the conductive plate of interest may equivalently serve as an antenna earth plate. Hence, an expensive microstrip base plate has only to have an area substantially the same as the area of the antenna element. Since the conductive plate is far thinner than a microstrip base plate, substituting the conductive plate for part of the antenna earth plate is successful in providing an extra space for accommodating parts which corresponds to the thickness of a microstrip base plate, thereby miniaturizing the pager.

Further, a conductive film (or plate) is provided on the microstrip antenna further outside of the antenna element and connected to the antenna earth plate by through holes. Then, the conductive film has ground potential. It follows that the conductive film and through holes prevent a displacement current from the antenna element from reaching the screws and other conductive structural parts and elements, so long as the former is located to surround the latter. Therefore, the radiation directivity pattern of the antenna is not effected by changes in the size and position of the structural parts and elements, whereby the structural design freedom of the pager is enhanced.

If desired, the antenna element may be formed with slits in the vicinity of the short-circuit side in order to lower the resonance frequency of the microstrip antenna. Then, if the frequency of the paging signal is the same, the area of the antenna element and, therefore, the overall size of the pager can be reduced.

DETAILED DESCRIPTION OF THE PREFERRED EMBODIMENT

Figure 1:
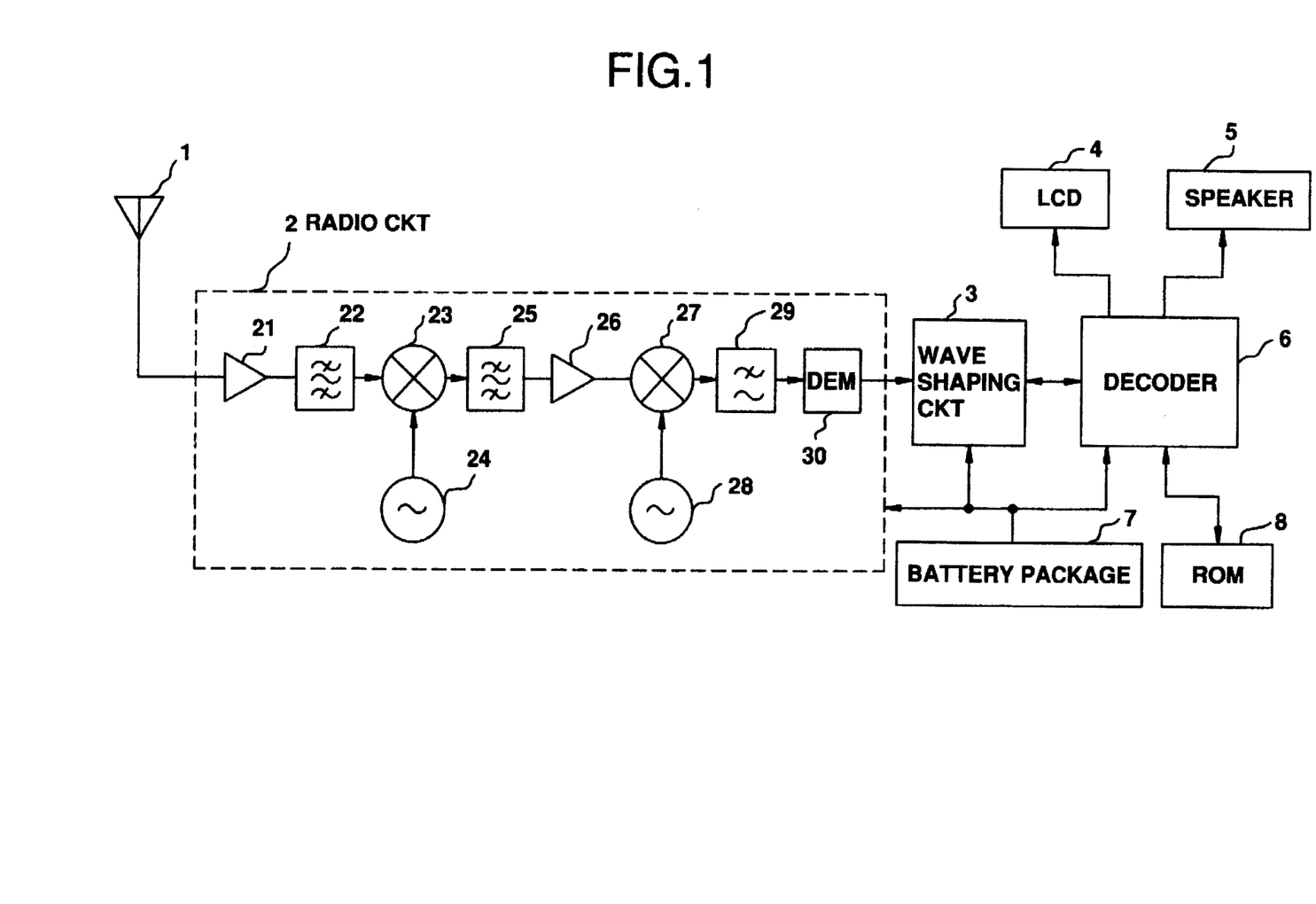
FIG. 1 is a block diagram schematically showing a radio pager embodying the present invention.

Referring to FIG. 1 of the drawings, a radio pager embodying the present invention is shown and includes a half-size microstrip antenna 1. A paging signal (frequency of 930 MHz) coming in through the microstrip antenna 1 is applied to a radio circuit 2. The radio circuit 2 receives the paging signal by the double superheterodyne principle to produce a corresponding second intermediate frequency (IF) signal (frequency of 455 kHz) and then demodulates it into a digital signal. The digital signal has its waveform shaped by a waveform shaping circuit 3 and then fed to a decoder 6. The decoder 6 compares a call signal included in the digital signal with an address number assigned to the pager and stored in a ROM 8. If the former is identical with the latter, the decoder 6 drives a loudspeaker 5 to produce an alert tone. At the same time, if the digital signal includes a message signal, the decoder 6 displays a message corresponding to the message signal on an LCD 4. A battery package 7 feeds the radio circuit 2, waveform shaping circuit 3, and decoder 6. A DC/DC converter, not shown, is included in the decoder 6 for feeding various circuits constituting the decoder 6, LCD 4, etc.

The radio circuit 2 includes an amplifier 21 for amplifying the received signal coming in through the microstrip antenna 1, a band-pass filter 22, and a first frequency converter (referred to as a first mixer hereinafter) 23 which receives the output of the band-pass filter 22. The first mixer 23 mixes the amplified received signal with a first local oscillation signal (frequency of 908 MHz and signal level of about −15 dBm) fed from a first local oscillator 24, thereby outputting a first IF signal (frequency of 21.4 MHz). The first IF signal has needless components thereof removed by a band-pass filter 25, amplified by an amplifier 26, and then applied to a second frequency converter (referred to as a second mixer hereinafter) 27. The second mixer 27 mixes the amplified first IF signal with a second local oscillation signal (frequency of 20.945 kHz) from a second local oscillator 28 to thereby produce the previously mentioned second IF signal. The second IF signal has needless components thereof removed by a low-pass filter 29 and then converted to the previously stated digital signal by a demodulator (DEM) 30. The receiver further includes a power switch and other conventional electric and electronic elements, although not shown or described.

Figure 2:
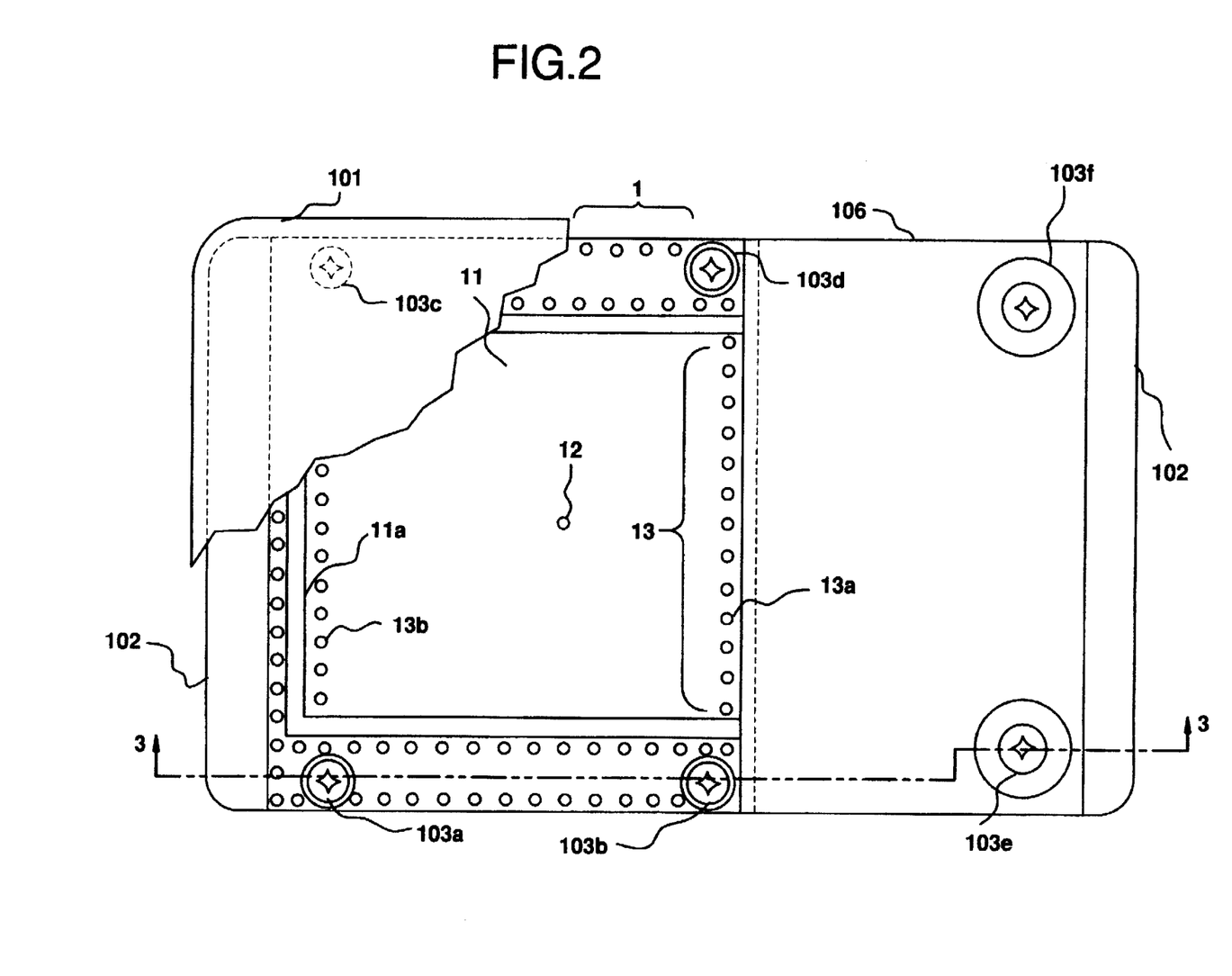
FIG. 2 is a partly taken away front view of the embodiment.
Figure 3:
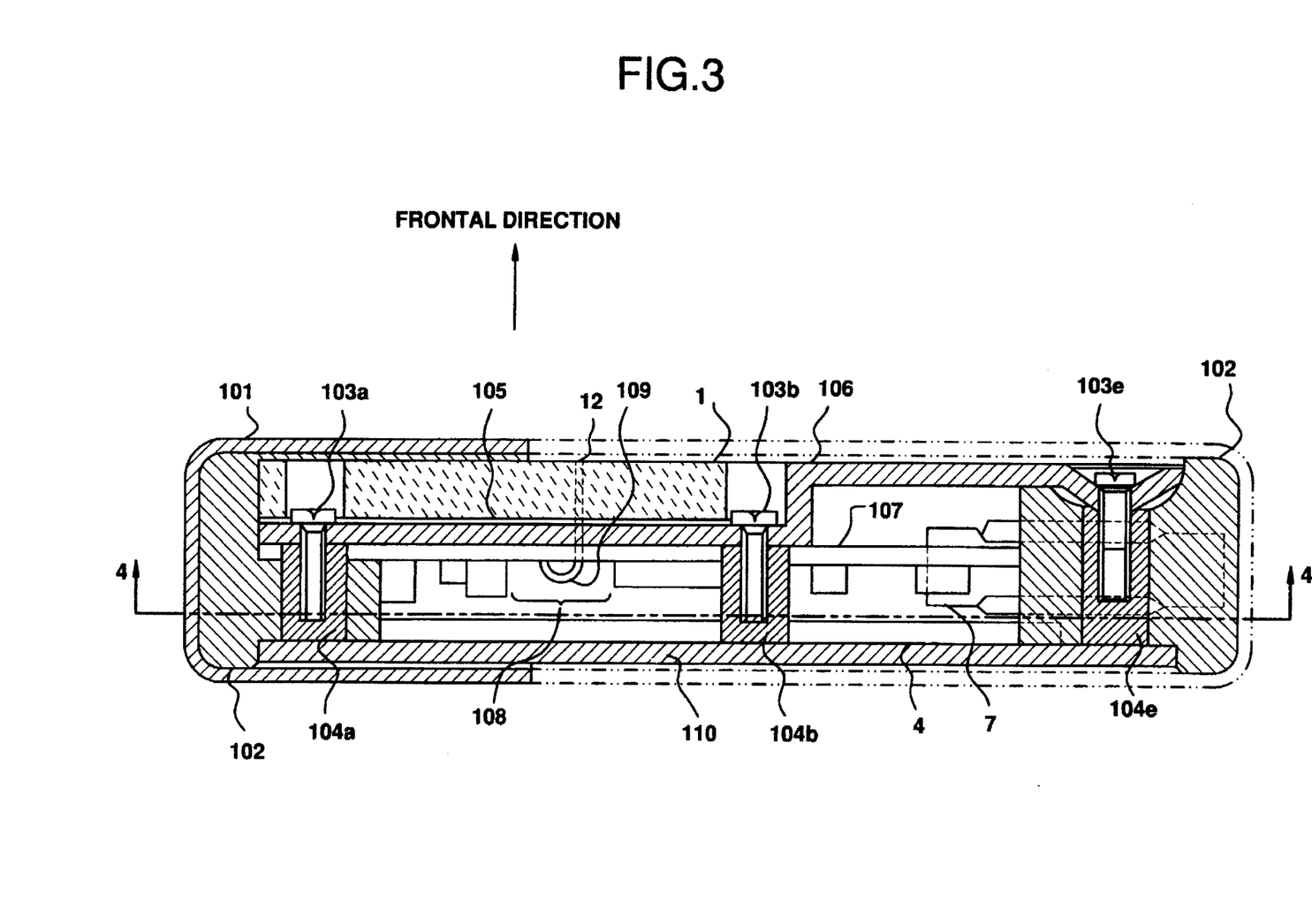
FIG. 3 is a section along line A1–A2 of FIG. 2.
Figure 4:
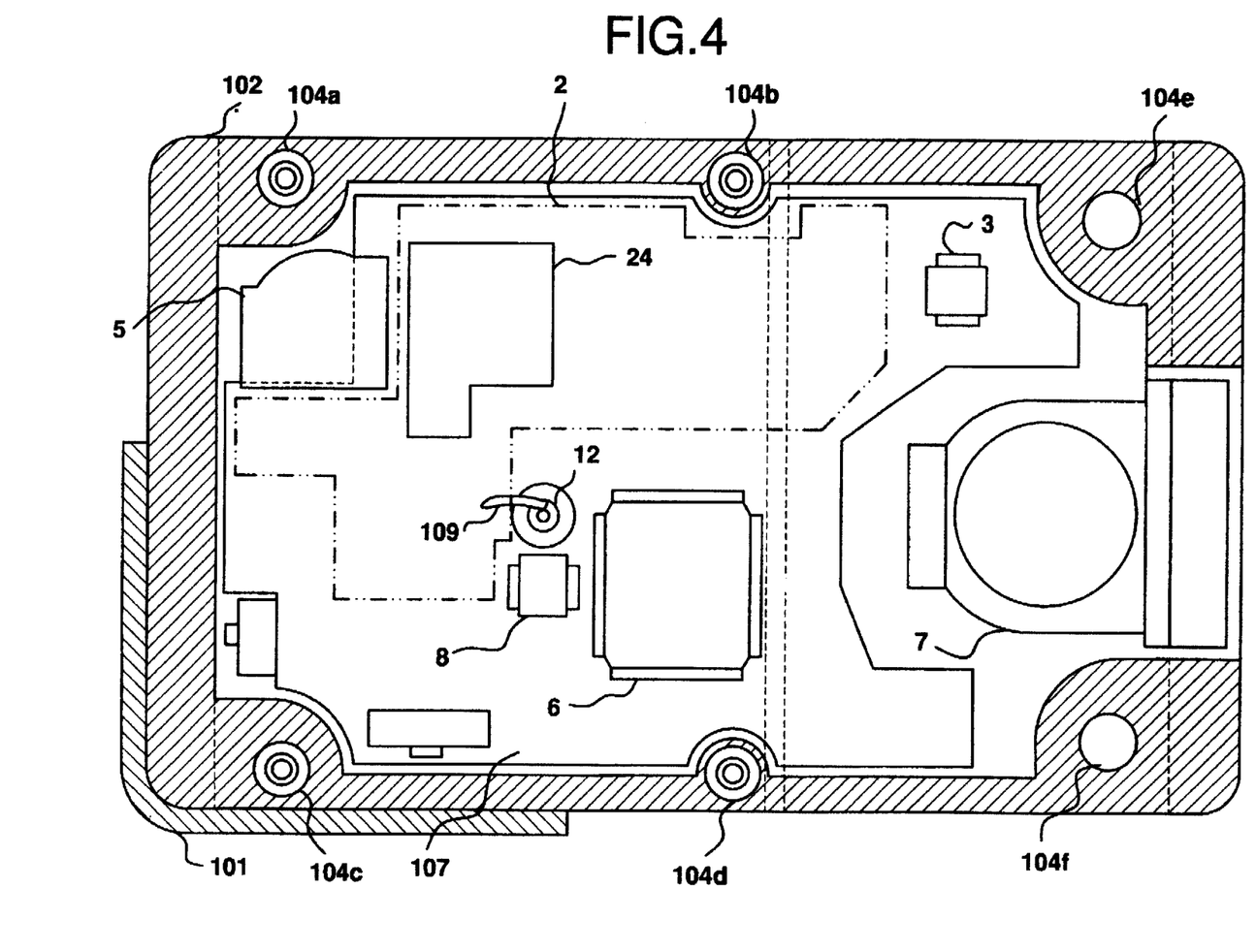
FIG. 4 is a section along line B1–B2 of FIG. 2 and in which a radio circuit 2 and a first local oscillator 24 are representative of areas for mounting parts.

Referring also to FIGS. 2, 3 and 4, the radio pager has a printed circuit board 107 on which electric and electronic parts 108 implementing part of the receiver circuitry, i.e., radio circuit 2, waveform shaping circuit 3, loudspeaker 5, decoder 6 and ROM 8 are mounted. Sheet metal or similar electrical conductive plates 106 and 110 are positioned on both sides of the printed circuit board 107 and LCD 4 supported by the board 107. The conductive plates 106 and 110 are fastened together by metal screws 103a–103f located around the circuit board 107 and nuts 104a–104f affixed to the inner surface of the conductive plate 110 by spot welding. An arrangement is made such that the inner surface of the conductive plate 106 and the ground surface of the printed circuit bard 107 (opposite to the surface carrying the parts 108) are connected to each other with respect to DC and high frequency. Hence, the conductive plates 106 and 110, screws 103a–103f and nuts 104a–104f form a shield case accommodating the printed circuit board 107 and electric and electronic parts 108. This is successful in reducing the radiation of unnecessary electromagnetic waves from, for example, the first local oscillator 24 to the outside of the pager. For example, a radio pager R5N4-14D (available from NEC Corp., Tokyo, Japan and put on the market December 1991) having the above configuration was found to reduce the radiation level to 25 μV at a distance of 3 m without resorting to a shield case for the first local oscillator 24. The outer surface of the conductive plate 106 and the earth plate, not shown, of the microstrip antenna 1 are connected to each other with respect to high frequency by thermal adhesion with the intermediary of a thermal adhesion tape 105. With such a configuration, the pager prevents high-frequency electromagnetic coupling from occurring between the antenna 1 and the printed circuit board 107 and parts 108 and insures stable operations of the circuitry mounted on the circuit board 107. It is to be noted that the conductive plates 106 and 110 exhibit a satisfactory electromagnetic shield effect even when locally perforated or provided with a mesh structure. The screws 103a–103f and nuts 104a–104f may be replaced with other conductive connecting pins so long as the pins are capable of affixing the conductive plates 106 and 110 while spacing them apart by a predetermined distance.

A frame 102 is implemented as a plastic molding and surrounds the antenna 1, conductive plates 106 and 110, printed circuit board 107, LCD 4, and battery package 7 to substantially determine the contour of the pager. Further, a case 101 covers the frame 102, conductive plates 106 and 110, antenna 1 and other parts constituting the pager. If desired, smoothly planed board may be arranged on the outside of the conductive plates 106 and 110 and antenna 1 to protect the above-mentioned constituent parts. The conductive plates 110 and 106 (as well as the smoothly planed board) are provided with openings to make the display surface of the LCD 4 visible from the outside of the pager.

As shown in FIGS. 1–4, the conductive plate 106 is bent in a step or crank configuration to form a recessed flat portion and a projecting flat portion. The earth plate of the microstrip antenna 1 is fitted on the recessed portion of the conductive plate 106 by pressure while the battery package 7 having a substantial height is accommodated in the projected portion of the plate 106. Specifically, since the conductive plate 106 is far thinner than the antenna 1, it is bent in a crank configuration to increase the space available in the pager by an amount corresponding to the thickness of the antenna 1.

The microstrip antenna 1 has an antenna element 11 and receives a paging signal in a direction perpendicular to the general plane of the antenna element 11, i.e., in the frontal direction of the pager. In the antenna 1, a short circuit 13 is constituted by a number of through holes 13a and forms the short-circuit end of the antenna element 11. A through hole 12 is interposed between the short circuit 13 and the open end 11a of the antenna element 11, defining the feed point of the antenna 1. The previously mentioned projected portion of the conductive plate 106 equivalently constitutes an earth plate of the antenna 1 to thereby increase the overall area of the earth plate and, therefore, the antenna gain Ga in the frontal direction. A jumper line, e.g., solder 109 connects the through hole 12 and the input terminal of the radio section 2 (input terminal of amplifier 21) mounted on the printed circuit board 107.

Figure 5A:
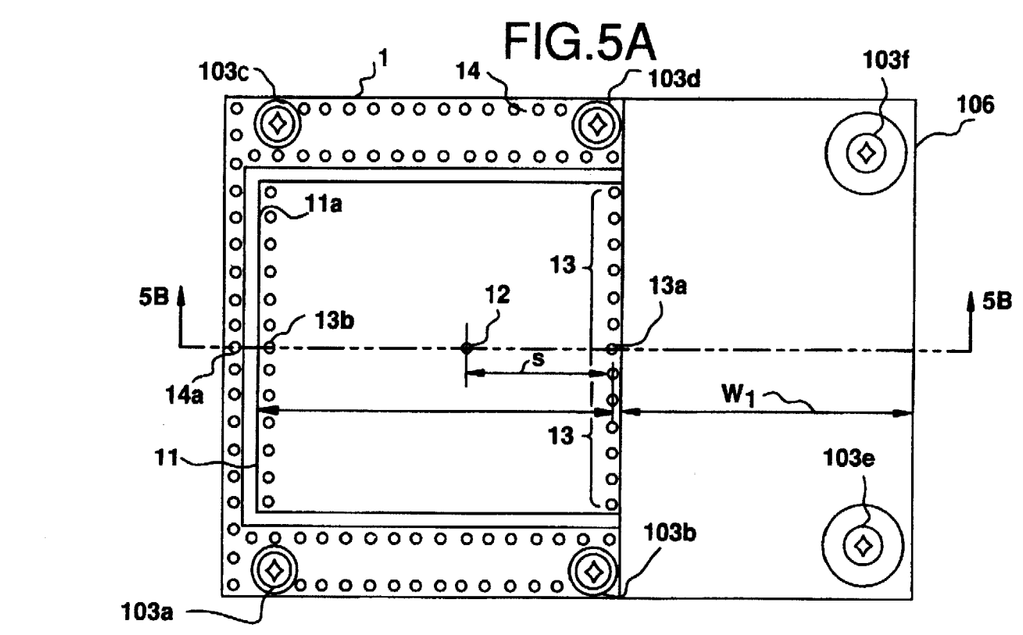
FIGS. 5(a) and 5(b) are respectively a front view and a section along line C1–C2 of FIG. 5(a), showing a specific configuration of an antenna assembly included in the embodiment.
Figure 5B:
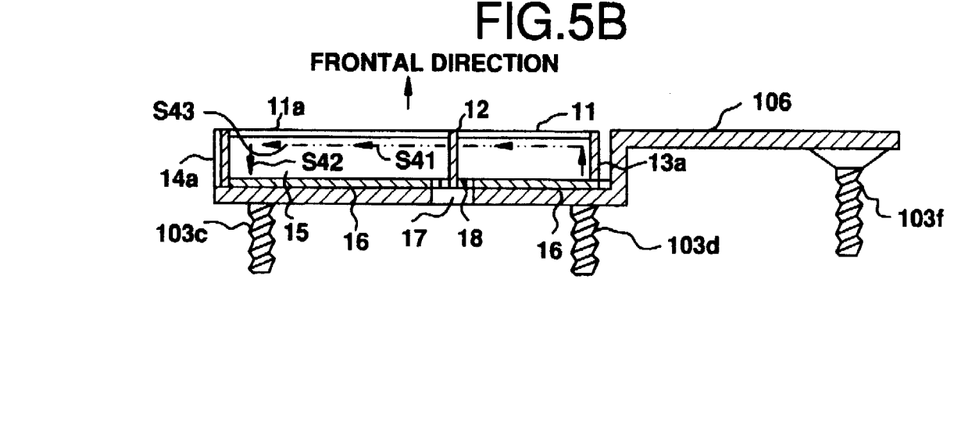

As shown in FIGS. 5(a) and 5(b), the microstrip antenna 1 and conductive plate 106 constitute an antenna assembly. To fabricate the antenna 1, a dielectric base plate 15 made of Teflon and carrying copper foil on both surfaces thereof is etched to remove part of the copper foil. As a result, the antenna 1 has the quadrangular antenna element 11 on one surface and a conductive earth plate 16 on the other surface.

the earth plate 16 extending over substantially the entire area of the antenna 1. A side conductive plate 14 surrounds the antenna element 11 on the surface of the base plate 15 where the antenna element 11 is formed. A number of through holes 14a are formed on the side conductive plate 14 adjacent to the edges of the latter, whereby the conductive plate 14 is maintained at the same potential as the earth plate 16, i.e. ground potential. Further, the antenna 1 has a land 18 on the surface thereof where the earth plate 16 is located. The land 18 is connected to the through hole 12 and insulated from the earth plate 16, defining the feed point 17 of the antenna 1.

Assume that the velocity of light is CO, the dielectric constant of the dielectric base plate 15 is εr, and the distance between the open end 11a of the antenna element 11 and the short circuit 13 is D1. Then, a resonance frequency fO that maximizes the gain Ga of the microstrip antenna 1 may be expressed as:

$$fO=CO/\{4D1(\varepsilon r)^{1/2}\}$$

although it delicately changes depending on, for example, the thickness t of the base plate 15. Assume that the frequency fO is 930 MHz, and that the base plate 15 is made of Teflon and has a dielectric constant εr of 2.17 and a thickness t of 1.6 mm. Then, the distance D1 is 54.5 mm as determined by calculation, although it was found to be 55.3 mm by actual measurement. The short circuit 13 and the through hole 12 are spaced apart by a distance S which is selected to match the input impedance of the radio circuit 2 after the impedance of the antenna 1, as viewed from the radio circuit 2 side, has been determined.

As shown in FIG. 5, the through holes 14a and side conductive plate 14 surround the screws 103a–103d and isolate them from the antenna element 11. Therefore, whatever dimension and whatever position the screws 103a–103d may have under the above condition, they do not effect the radiation pattern of the antenna 1 at all. Specifically, assume that a surface current S41 flows through the antenna element 11 and earth plate 16, and that the screws 103a–103d, side conductive plate 14 and through holes 14a are absent. Then, the surface current S41 will turn into a displacement current S42 at the open end 11a of the antenna element 11, and the current S42 will be terminated by the earth plate 16 and again turn into the current S41. On the other hand, if the side conductive plate 14 and through holes 14a are absent and the screws 103a–103d are located in the vicinity of the antenna element 11, a displacement current, not shown, from the open end 11a will be coupled to the screws 103a–103d as well. In this manner, the displacement current S42 is dependent on the dimension and potential of the screws 103a–103d, so that the radiation pattern of the antenna 1 is effected by the screws 103a–103d. This makes it difficult to predict the directivity characteristic of the antenna 1 at the design stage of a radio pager. In the illustrative embodiment, since the side conductive plate 14 and through holes 14a adjoin the antenna element 11 to electromagnetically isolate it from the screws 103a–103d, the surface current S41 will be simply split into a displacement current S43 directed to the side conductive plate 14 and the displacement current S42 directly terminated by the earth plate 16. Since the side conductive plate 14 assumes a fixed position and has a fixed size, the displacement current S42 is not effected by the dimension and potential of the screws 103a–103d and, therefore, the radiation pattern of the antenna 1 is not disturbed by the screws 103a–103d. Clearly, such an electromagnetic shield effect is achievable despite other conductive structural parts and elements which may be included in the pager, so long as such parts and elements are surrounded by the side conductive plate 14 and through holes 14a.

The antenna gain Ga of the microstrip antenna 1 in the frontal direction increases as the area of the earth plate 16 increases beyond the area of the antenna element 11, as stated earlier with reference to FIGS. 2–4. In the antenna assembly shown in FIG. 5, the conductive plate 106 is connected to the earth plate 16 with respect to high frequency, and the flat projected portion of the plate 106 extending in the same direction as the earth plate 16 is further extended from the short circuit 13 over a distance W1 to provide the antenna 1 with an extra earth plate area. The antenna assembly, therefore, has a greater antenna gain Ga in the frontal direction that with the antenna 1 alone. Specific numerical values regarding the antenna gain Ga will be described later.

Figure 6:
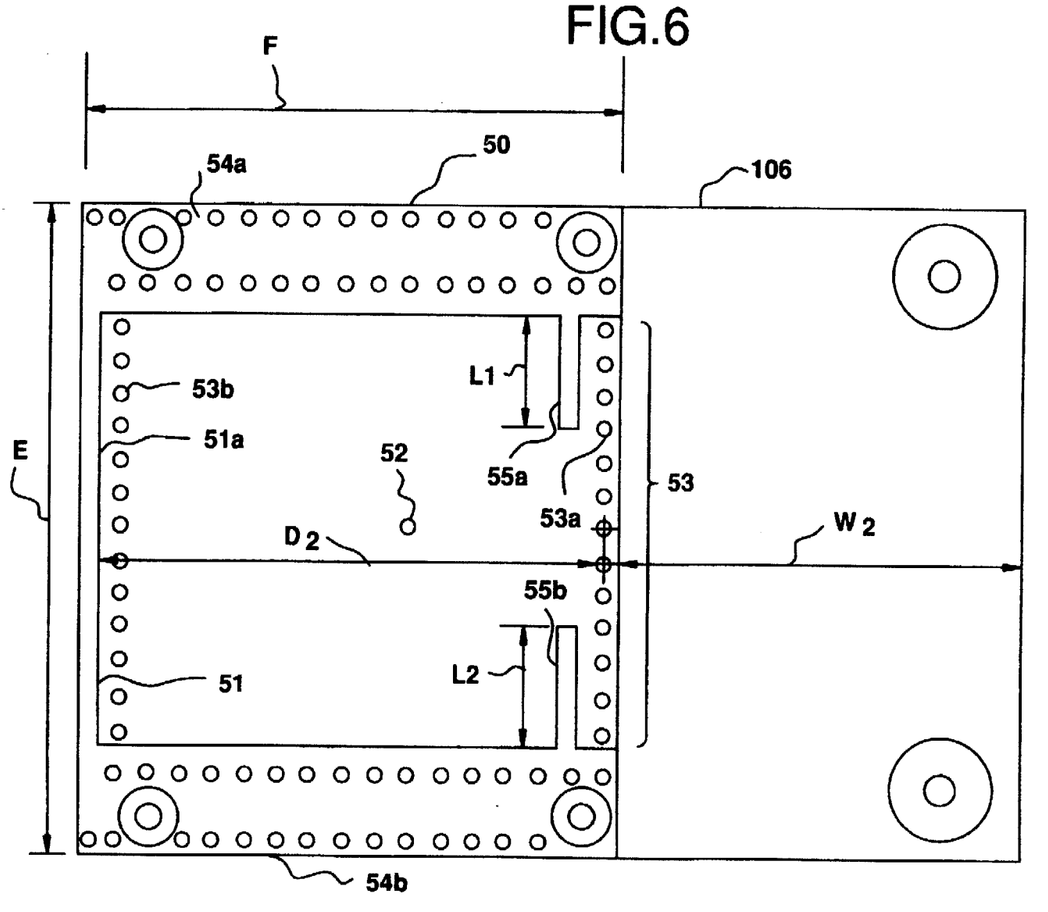
FIG. 6 is a front view showing another specific configuration of the antenna assembly.

FIG. 6 shows another specific construction of the antenna assembly. As shown, the antenna assembly is made up of a microstrip antenna 50 and the conductive plate 106. The antenna 50, like the antenna 1 of FIG. 4, has an antenna element 51 including an open end 51a and a short circuit 53, a through hole 52, side guide plates 54a and 54b, and an earth plate, not shown. The difference is that the side guide plates 54a and 54b are separated from each other since there is no side guide plate that faces the open end 51. The antenna element 51 has the conductor thereof partly removed to form slits 55a and 55b in the vicinity of the short circuit 53. The slits 55a and 55b have lengths L1 and L2, respectively. With the slits 55a and 55b, it is possible to lower the resonance frequency fO of the antenna 1 and, therefore, to reduce the size of the antenna 50. Specifically, the antenna 1 of FIG. 5 implements the resonance frequency of 930 MHz by spacing apart the short circuit 13 and the open end 11a by a distance D1 of 55.3 mm. By contrast, in the antenna 50 of FIG. 6, the slits 55a and 55b are formed in the antenna element 51 over a length L1 of 7.5 mm and a length L2 of 6 mm, respectively, whereby the distance D2 between the short circuit 53 and the open end 51a is desirably reduced to 48 mm.

Figure 7:
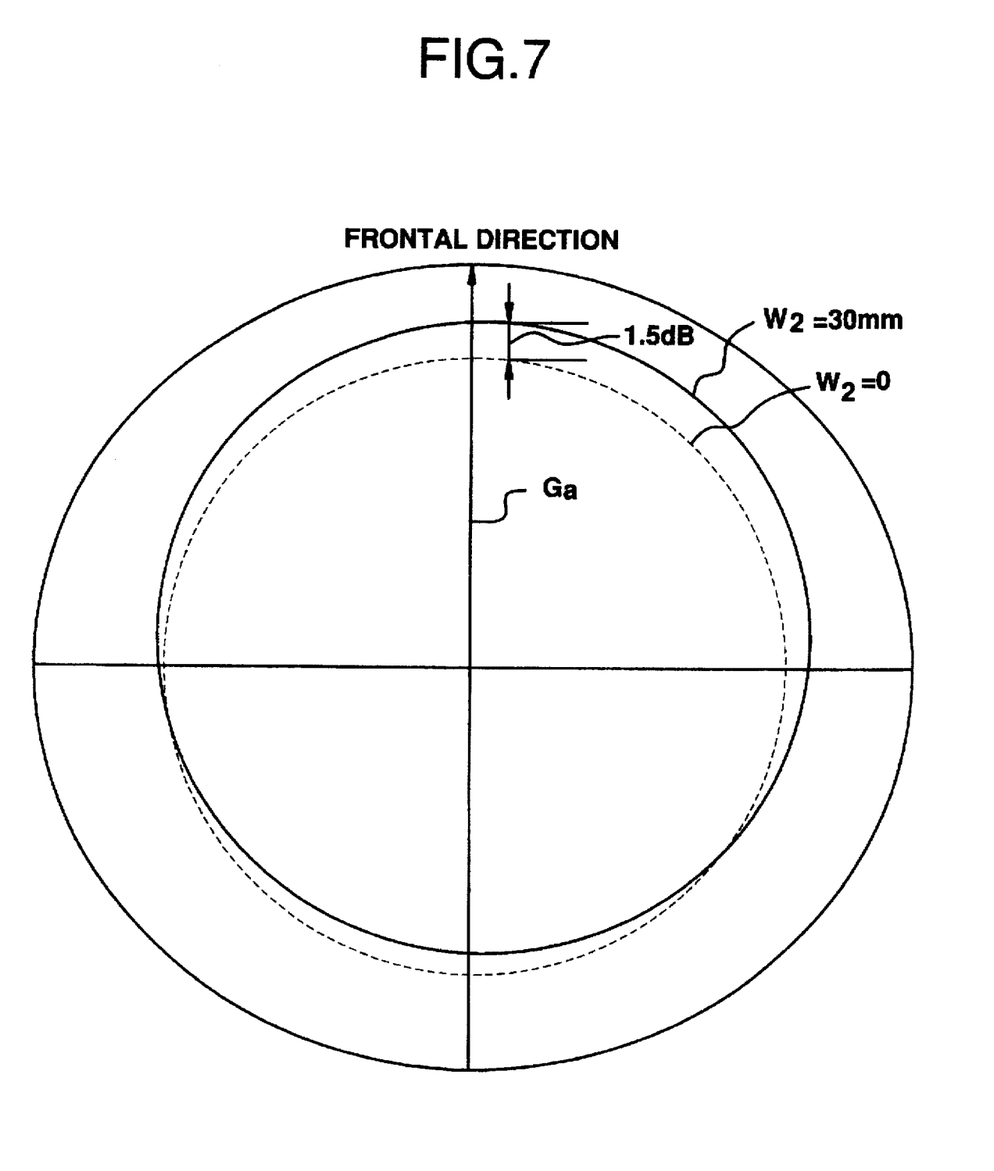
FIG. 7 shows an antenna pattern particular to the antenna assembly of FIG. 6.

Referring also to FIG. 7, the earth plate of the microstrip antenna 50 has dimensions E and F which are nearly equal to each other and are substantially 50 mm, and the conductive plate 106 extends over a distance W2 of 30 mm as measured from the end of the antenna 50. The antenna assembly was measured to have an antenna gain Ga in the frontal direction which was about 1.5 dB greater than the case wherein the distance W2 was zero, i.e., the conductive plate 106 was not connected to the earth plate of the antenna 1 with respect to high frequency. Obviously, such an increase in antenna gain Ga is also attainable with the antenna assembly of FIG. 5. Experiments showed that the antenna directivity pattern is effected little by the step between the outer surface of the conductive plate 106 and the earth plate of the antenna 50 which is equal to the thickness of the dielectric base plate which is substantially 1.6 mm.

Further, in the embodiment of FIGS. 2 to 6, instead of the through holes 13a (53a), the short circuit 13 (53) may be constituted by through holes 13b (53b) which are positioned on the side of the open end 11a (51a). In this case, the case 101 may be constituted by a metal plate and a frame as disclosed in the co-pending U.S. patent application Ser. No. 07/425,741 which corresponds to the Japanese Laid-Open Patent Publication (Kokai) No. 2-116228, and is incorporated herein.

In summary, the radio pager of the present invention has the two conductive plates 106 and 110 and screws 103a–103f which constitute a shield case surrounding the printed circuit board 107 and electric and electronic parts 108. The shield case reduces the radiation of unnecessary electromagnetic waves to the outside of the pager from, for example, the first local oscillator 24 while stabilizing the operation of the pager circuitry.

The antenna earth plate 16 is connected to the crank-shaped conductive plate 106 with respect to high frequency, and the flat projected portion of the plate 106 equivalently plays the role of an antenna earth plate. Therefore, the area of the antenna element 11 suffices the area of an expensive microstrip base plate alone. This, coupled with the fact that an extra space for accommodating parts and corresponding to the thickness of a microstrip base plate is available, promotes the miniaturization of a radio pager.

The side conductive plate 14 is provided on the surface of the antenna where the antenna element 11 is positioned in such a manner as to surround the antenna element 11, and it is connected to the earth plate 16 by the through holes 14a. Hence, so long as the screws 103a–103d and other structural parts and elements of the pager are surrounded by the through holes 14a, the radiation directivity pattern of the antenna 1 is not effected by changes in the position and size of the structural elements and parts at all. This enhances the structural design freedom of the pager.

When the slits 55a and 55b are formed in part of the antenna element 51 of the microstrip antenna 50, the resonance frequency fO of the antenna 50 and, therefore, the area of the antenna element 51 can be increased to thereby implement a miniature radio pager.

Although the invention has been described with reference to the specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. An antenna arrangement comprising:
    an antenna element comprising:
        i) first and second conductive films formed on a first major surface of a flat dielectric plate;
        ii) a third conductive film formed on a second major surface of the flat dielectric plate, said second major surface being opposite said first major surface;
        iii) first connecting means for connecting said first and third conductive films; and
        iv) second connecting means for connecting said second and third conductive films;
    a first conductive plate electrically connected to said antenna element and bent in a crank configuration, said first conductive plate accommodating said antenna element in a recessed portion of said crank configuration wherein said first connecting means is arranged at a crank portion of said crank configuration; and
    third connecting means formed on said second conductive film which connects said antenna element and said first conductive plate.

2. An antenna arrangement as claimed in claim 1, further comprising:
    a printed circuit board for mounting an electric circuit which processes a signal received by said antenna element;
    a second conductive plate located opposite to said first conductive plate so that said printed circuit board is disposed between said first and second conductive plates; and fourth connecting means for connecting said first and second conductive plates.

3. An antenna arrangement as set forth in claim 1, further comprising an electromagnetic shielding means for electromagnetically shielding said third connecting means from said antenna element.

4. An antenna arrangement as set forth in claim 3, wherein said electromagnetic shielding means is a third conductive plate which is disposed outside said third connecting means and said antenna element.

* * * * *